(12) United States Patent
Agarwal et al.

(10) Patent No.: US 11,176,752 B1
(45) Date of Patent: Nov. 16, 2021

(54) VISUALIZATION OF A THREE-DIMENSIONAL (3D) MODEL IN AUGMENTED REALITY (AR)

(71) Applicant: Amazon Technologies, Inc., Seattle, WA (US)

(72) Inventors: Mukul Agarwal, San Francisco, CA (US); Simon Fox, Palo Alto, CA (US); Jack Mousseau, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/836,184

(22) Filed: Mar. 31, 2020

(51) Int. Cl.
*G06T 19/00* (2011.01)
*G06T 15/06* (2011.01)

(52) U.S. Cl.
CPC ............ *G06T 19/006* (2013.01); *G06T 15/06* (2013.01); *G06T 2210/12* (2013.01); *G06T 2215/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,023,279 A * | 2/2000 | Sowizral | .................. | G06T 15/06 345/421 |
| 9,240,077 B1 * | 1/2016 | Kraft | .................. | H04N 5/23229 |
| 9,734,553 B1 * | 8/2017 | Naware | .............. | G06Q 30/0643 |
| 9,922,437 B1 * | 3/2018 | Baron | .................. | G06T 19/006 |
| 9,972,131 B2 * | 5/2018 | Vaughn | .................... | G06T 7/246 |
| 10,026,229 B1 * | 7/2018 | Yalniz | ................. | G06K 9/00671 |
| 10,186,084 B2 * | 1/2019 | Tawara | .................. | G06T 19/006 |
| 10,339,714 B2 * | 7/2019 | Corso | ................. | G06Q 30/0623 |
| 10,339,721 B1 * | 7/2019 | Dascola | .................. | G06T 13/20 |
| 10,444,005 B1 * | 10/2019 | Dryer | .................. | G01B 11/026 |
| 10,649,581 B1 * | 5/2020 | Smith | .................... | G06F 1/1647 |
| 10,991,163 B2 * | 4/2021 | Ravasz | .............. | G06F 3/04842 |
| 2002/0163515 A1 * | 11/2002 | Sowizral | ................. | G06T 15/40 345/419 |
| 2011/0267265 A1 * | 11/2011 | Stinson | ................... | G06F 3/017 345/157 |
| 2016/0104322 A1 * | 4/2016 | Fleischmann | .......... | G06F 3/017 345/419 |

(Continued)

OTHER PUBLICATIONS markdaws.net, "ARKit By Example—Part 2: Plane Detection + Visualization," Jun. 11, 2017 [ https://blog.markdaws.net/arkit-by-example-part-2-plane-detection-visualization-10f05876d53?gi=206131992b1].

(Continued)

*Primary Examiner* — Motilewa Good Johnson
(74) *Attorney, Agent, or Firm* — Patterson + Sheridan, LLP

(57) ABSTRACT

Techniques for improving the visualization of three-dimensional (3D) models of items on computing devices for augmented reality (AR) are described. One technique includes obtaining a virtual representation of an item and detecting a plane within a physical environment. A range of distances to the plane from a computing device for visualizing the virtual representation on a screen of the computing device is determined based on (i) physical attribute(s) of the screen and (ii) physical attribute(s) of the virtual representation. The virtual representation is rendered on the screen for positions on the plane that are within the range of distances from the computing device. The virtual representation is not rendered on the screen for positions on the plane that are outside of the range of distances from the computing device.

20 Claims, 13 Drawing Sheets

(56) References Cited

U.S. PATENT DOCUMENTS

| | | | |
|---|---|---|---|
| 2016/0353018 A1* | 12/2016 | Anderson | G02B 27/017 |
| 2017/0323488 A1* | 11/2017 | Mott | G06T 19/006 |
| 2017/0372499 A1* | 12/2017 | Lalonde | G06F 3/011 |
| 2019/0026936 A1* | 1/2019 | GorurSheshagiri | G06F 3/0304 |
| 2019/0065027 A1* | 2/2019 | Hauenstein | G06F 3/017 |
| 2019/0228588 A1* | 7/2019 | Rockel | G06F 3/011 |
| 2019/0272425 A1* | 9/2019 | Tang | G06K 9/6232 |
| 2019/0311527 A1* | 10/2019 | Schwab | G06T 15/20 |
| 2019/0385371 A1* | 12/2019 | Joyce | G06T 19/006 |
| 2020/0004327 A1* | 1/2020 | Wang | G06F 3/013 |

* cited by examiner

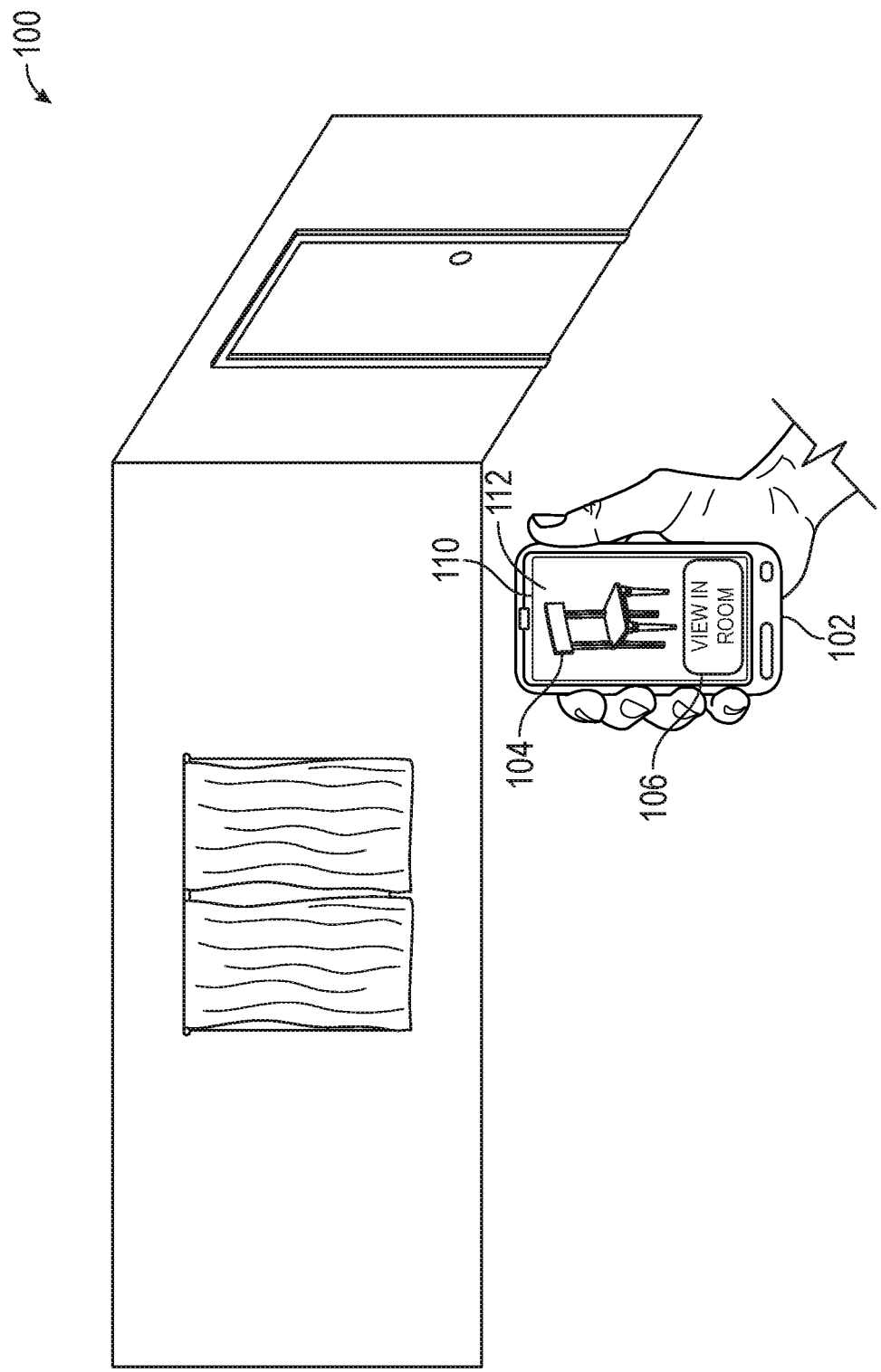

VISUALIZATION OF A THREE-DIMENSIONAL (3D) MODEL IN AUGMENTED REALITY (AR)

BACKGROUND

The present invention relates to augmented reality (AR), and more specifically, to techniques for improving the visualization of virtual objects in AR on a computing device.

AR involves superimposing computer generated imagery on a user's view of the real-world environment. An AR system can use a video device to display a series of images (or video feed) of the real-world environment to a user, where the images have various virtual objects inserted into appropriate places in the environment. For example, the AR system can identify a real-world object of a table, so that a virtual object of a cup may be displayed on the video device as appearing on the table (e.g., from the perspective of the video device). AR can be used for shopping, navigational purposes, games, construction/architectural projects, educational purposes, and the like.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

FIG. 1A-1B illustrate an example scenario of visualizing a virtual object in a physical environment with a computing device.

DETAILED DESCRIPTION

Some retail software applications include AR functionality that allows users to virtually interact with various items (e.g., products for sale) in a physical (or real-world) environment. Users can use the AR functionality to preview what a given item would like in the physical environment prior to purchasing the item. For example, the AR functionality may allow users to determine whether a furniture item will fit in (or is the right size for) a living room, determine how a potted plant fits and looks next to a window in a room, mix and match different attributes (e.g., color, size, etc.) of an item with other physical objects in a room, and the like.

One issue with conventional AR functionality in software applications is that the AR functionality generally provides an initial visualization of the virtual item (or object) that is not fully visible within a screen of the user device. That is, conventional AR functionality does not account for the dimensions of the user device, distance from the user device to a planar surface (e.g., ground, table, etc.), and the size (e.g., physical dimensions) of the virtual object when rendering virtual objects on the user device. Consequently, with conventional software applications, when a user attempts to visualize certain items (e.g., items that have a large size, such as a couch or sofa) in a physical environment, the user may initially only be able to see a very small portion of the item on their user device, leading to confusion and a negative user experience.

Figure 1B:
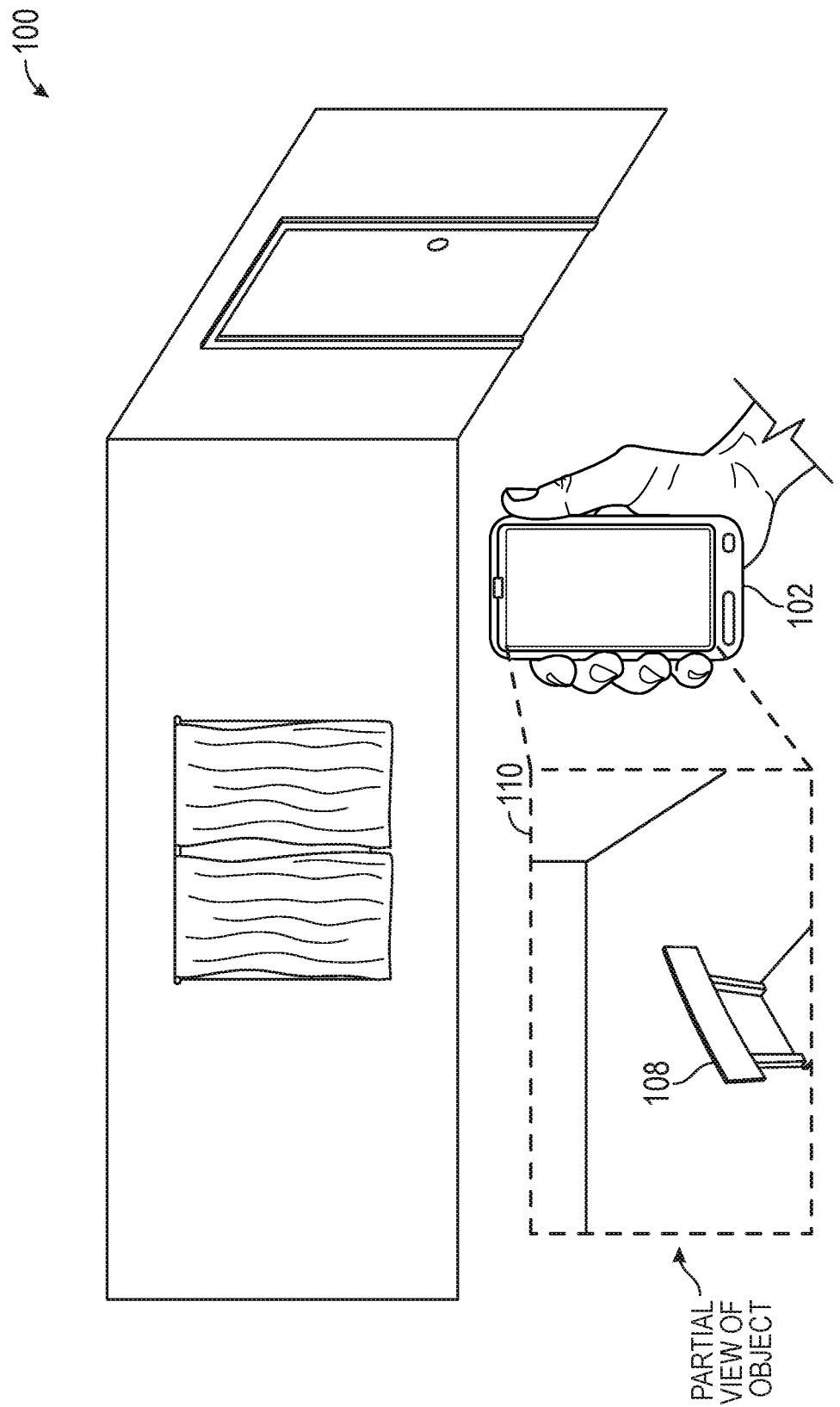

FIGS. 1A-1B illustrate an example scenario in which conventional AR functionality (or features) can cause a negative (or poor) user experience when visualizing virtual objects in a physical environment. Here, a user may browse (or search) for a particular category of items (e.g., office furniture) using a retail software application on a computing device 102, and select to view more information regarding a particular item (e.g., office chair) from the category of items. In FIG. 1A, for example, the user is shown a product detail page 112 for an item (e.g., chair) 104 on a screen 110 of the computing device 102. The product detail page 112 may include various information related to the item 104, including, for example, product reviews, product description, visual appearance of the item, price, rating, product (object) identifier (ID), etc.

The product detail page 112 may also provide the user with the option to virtually interact with the item 104 in a physical environment 100. Here, for example, the user can select the button prompt 106 (e.g., "View in Room") to enable an AR feature that allows the user to preview what the item 104 would look like in the physical environment 100 (e.g., a room). Once the AR feature is selected, the AR feature generally prompts the user to point the computing device 102 towards the floor so that the computing device 102 can scan the floor using a camera(s) on the computing device 102. Once a plane is detected from the scan, the AR feature generally allows the user to place a three-dimensional (3D) model 108 (e.g., virtual object) of the item 104 at a position on the plane.

However, due in part to the orientation of the computing device 102 (e.g., the computing device 102 may be pointed towards the floor from the scan), the user may not be able to visualize the entire 3D model 108 of the item 104 on the screen 110 once it is rendered. Here, in FIG. 1B, for example, the user is shown a partial view of the 3D model 108 within the screen 110. This is due in part to the physical dimensions of the 3D model 108 (e.g., when projected into the physical environment 100 at the placement position) not fitting within the physical dimensions of the screen 110 of the computing device 102.

Providing such an initial partial view of the 3D model 108 can cause user confusion. For example, the user may not know the reason why the user can only see a partial view of the 3D model 108 and/or the precise distance from the computing device 102 the 3D model 108 needs to be placed in order to visualize the entire 3D model 108 within the screen 110. In this case, for example, the user may have to adjust the tilt of the computing device 102 to an angle (with respect to the floor), such that the 3D model 108 is placed at a certain distance (away from the computing device 102), which allows for the entire 3D model 108 to be visible within the screen 110. However, because users may be unfamiliar with AR functionality, conventional AR functionality can cause user confusion, which in turn, can cause users to abandon the AR feature and/or the software application.

Embodiments described herein provide techniques that enable improved visualization of virtual objects (e.g., 3D models of physical (or real-world) objects) on computing devices. More specifically, embodiments provide techniques for determining an optimal distance (or range of distances) from a computing device to visualize a virtual object using a computing device. As described in more detail below, embodiments can determine the optimal distance(s), based at least in part on the size of the virtual object (e.g., the physical dimensions of the 3D model when projected onto a screen of the computing device), the physical dimensions of the screen of the computing device, and the distance from the computing device to the visualization surface. Embodiments may refrain from rendering (or displaying) the virtual object upon determining that the virtual object (once rendered) would not be able to fit within a given computing device's screen. Likewise, embodiments may render the virtual object upon determining that the virtual object (once rendered) would be able to fit within the given computing device's screen. In this manner, embodiments can significantly enhance user experience with AR features in software applications.

Note that certain embodiments are described herein using a retail software application for various household items (e.g., furniture) as an example of computer software that can provide improved visualizations of such items in a physical environment. In other embodiments, the techniques presented herein may be used for visualization of a wide variety of items (e.g., clothing, groceries, books, electronics, etc.) and can be used by a broad variety of retailers (e.g., discount stores, department stores, etc.). As used herein, a physical object (or item or product) may also be referred to as real-world object (or item or product). Similarly, as used herein, a virtual object (or item) may be referred to as a 3D model (of a physical object), an AR object, a virtual representation (of a physical object), etc.

Figure 2:
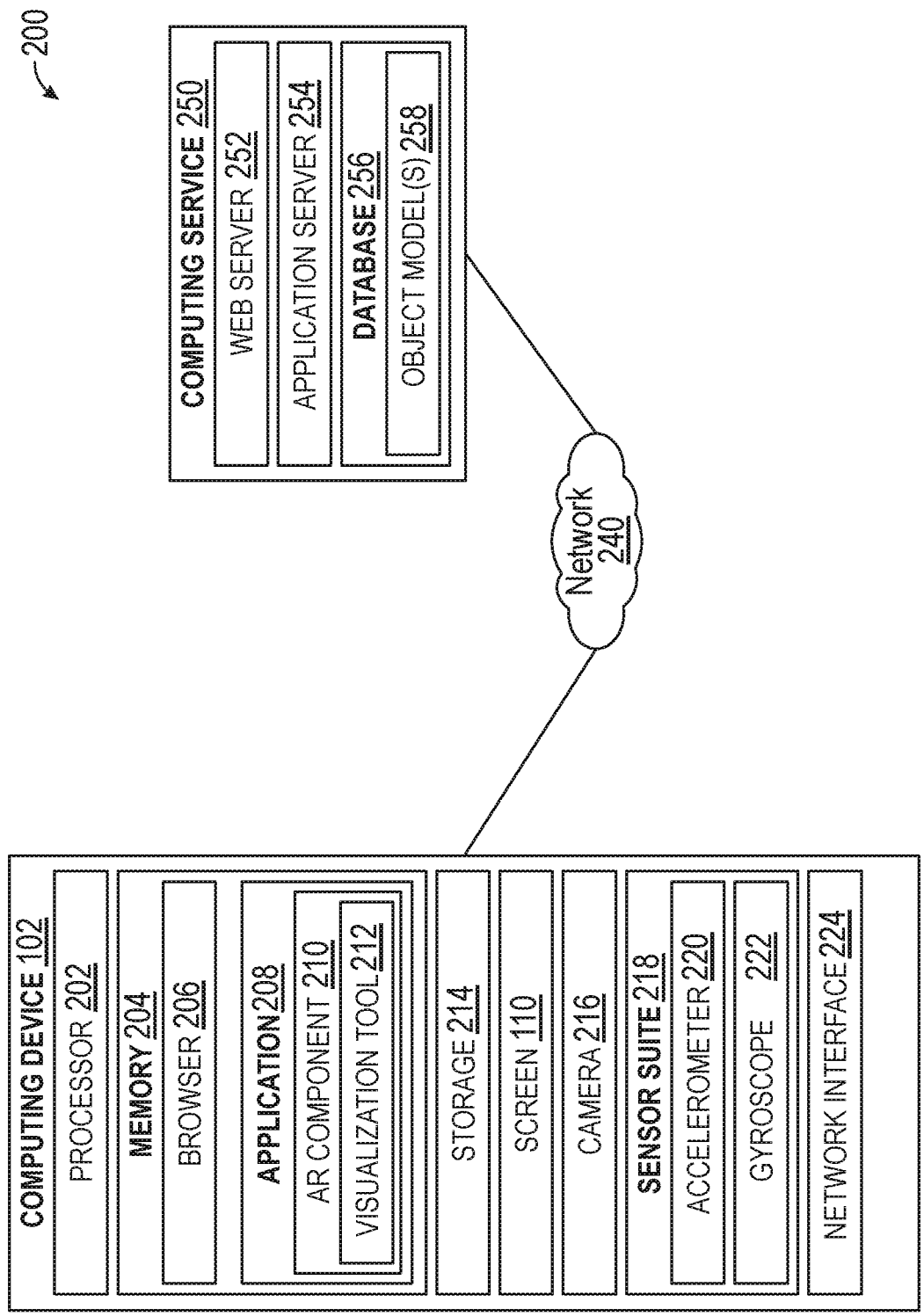
FIG. 2 illustrates an example of a computing environment used to provide AR features for a retail software application, according to one embodiment.

FIG. 2 illustrates an example of a computing environment 200 used to provide AR features for a retail software application, according to one embodiment. As shown, the computing environment 200 includes a computing device 102 and a computing service 250, which are interconnected via a network 240. The network 240, in general, may be a wide area network (WAN), a local area network (LAN), a wireless LAN, a personal area network (PAN), a cellular network, etc. In a particular embodiment, the network 240 is the Internet.

Computing device 102 is generally representative of a mobile (or handheld) computing device, including, for example, a smartphone, a tablet, a laptop computer, etc. Here, the computing device 102 includes a processor 202, a memory 204, storage 214, a screen 110, a camera 216, a sensor suite 218, and a network interface 224. The processor 202 represents any number of processing elements, which can include any number of processing cores. The memory 204 can include volatile memory, non-volatile memory, and combinations thereof.

The memory 204 generally includes program code for performing various functions related to applications (e.g., applications 208, browser(s) 206, etc.) hosted on the computing device 102. The program code is generally described as various functional "applications" or "modules" within the memory 204, although alternate implementations may have different functions or combinations of functions. Here, the memory 204 includes a browser 206 and an application 208, which includes an AR component (or application or module) 210. The AR component 210 is generally configured to provide one or more AR effects to a user, e.g., for the application 208, browser 206, etc. Note, the AR component 210 is described in more detail below.

The storage 214 may be a disk drive storage device. Although shown as a single unit, the storage 214 may be a combination of fixed and/or removable storage devices, such as fixed disc drives, removable memory cards, or optical storage, network attached storage (NAS), or a storage area-network (SAN). The network interface 224 may be any type of network communications interface that allows the computing device 102 to communicate with other computers and/or components in the computing environment 200 via a data communications network (e.g., network 240).

The screen 110 (also referred to as a display) and camera 216 (also referred to as video device) allow the user to view the physical environment (e.g., physical environment 100) where the computing device is located, from the perspective of the computing device 102. For example, the camera 216 can capture a series of images (or a video feed) of the physical environment, and the video feed can be shown on the screen 110 of the computing device 102. As described below, the camera 216 may be activated to provide (to the screen 110) a video feed over which virtual objects may be overlaid or into which virtual objects may be inserted. In this case, the screen 110 may allow the user to view the environment into which virtual objects are inserted. The screen 110 may include a Liquid Crystal Display (LCD), Light Emitting Diode (LED), or other display technology. In one embodiment, the screen 110 includes a touch-screen interface. In one embodiment, the camera 216 is provided in conjunction with image recognition software (e.g., stored in memory 204) to identify physical objects in the field of view of the camera 216.

The sensor suite 218 includes one or more sensors that are configured to sense information from the physical environment. In this embodiment, the sensor suite 218 includes an accelerometer 220 and a gyroscope 222. The accelerometer 220 measures acceleration forces acting on the computing device 102 and may provide information as to whether the computing device 102 is moving, and in which direction(s). In one embodiment, the accelerometer 220 can be used to determine a tilt of the computing device 102. The gyroscope 222 can measure orientation of the computing device 102, and provide information as to whether the computing device 102 is level or to what degree the computing device 102 is tilted in one or more planes. In one embodiment, the combination of the accelerometer 220 and the gyroscope 222 may provide information of a direction sense for the computing device 102 in terms of pitch and roll with respect to gravity. In general, the computing device 102 may include any number of sensors and/or utilize any technique or combination of techniques, suitable with the functionality described herein, to determine an orientation (e.g., tilt) of the computing device 102.

Note that the sensor suite 218 can include various types of sensors and is not limited to the accelerometer 220 and the gyroscope 222. Other types of sensors that can be included in the sensor suite 218 include, but are not limited to, a Global Positioning System (GPS) receiver, inertial motion units (IMUs), or any type of sensor that provides information regarding a position and/or location of the computing device 102 in a physical environment.

The computing device 102 is generally configured to host applications used to access the computing service 250. For example, the computing device 102 includes a web browser 206 (within memory 204) used to access the computing service 250 by rendering web pages received from the computing service 250. The computing device 102 also includes an application 208 (within memory 204), which is representative of a component of a client server application (or other distributed application) which can communicate with the computing service 250 over the network 240. Application 208 may be a "thin" client where the processing is largely directed by the application 208, but performed by computing systems of the computing service 250, or a conventional software application installed on the computing device 102.

The computing device 102 may access the computing service 250 over the network 240 using the browser 206 and/or the application 208. For example, in the case where the computing service 250 provides a retail software application, the browser 206 and the application 208 may provide software which allows a user to browse through a given retailer's inventory and select item(s) for purchase. The software application may also provide other features, such as the ability to post questions and answers about various items using an online community, provide feedback about various items to the software application, etc.

As shown, the computing service 250 includes a web server 252, an application server 254, and a database 256. In this example, the computing service 250 is generally modeled as a service back-end (e.g., web server 252, application server 254, and a database 256). Of course, other software architectures or distributed application frameworks could be used. Web server 252 and application server 254 are representative of physical computing systems, as well as representative of virtual machine instances deployed to a computing cloud. Similarly, the database 256 can be located on a single computing system or distributed across multiple computing systems. The web server 252 may communicate with the application server 254 to respond to requests from applications on the computing device 102.

The application server 254 may respond to requests from computing devices by generating hypertext markup language (HTML) and related content passed to computing devices (via the web server 252) and rendered as a user interface (e.g., pages, including forms, windows, text fields, and so on, along with scripts or applets or widgets executed by a web browser). In some cases, the application 208 could generate information (or application) content to present data retrieved from the application server 254. In general, the application server 254 may be implemented using any suitable software programming language, application framework, web service solution stack, virtual application containers, etc., in order to present application features and content to a computing device.

In some cases, the application server 254 may include graphical user interface (GUI) components that can be presented on the computing device 102, e.g., for allowing a user to search for information content (e.g., browse items for purchase). The GUI components may include, for example, HTML components or code that generates HTML components that can be passed to the computing device 102 and rendered as a user interface. The GUI components may additionally include instructions executable by the computing device 102 to display a user interface using language-specific or operating system-specific GUI components (e.g., Abstract Window Toolkit, Swing API components on the Java platform, and so on). Generally, instructions capable of rendering a GUI on the computing device 102 may include computer executable code generated from compiling and/or interpreting C (or variants thereof), Java, PHP, Ruby, HTML, javascript, Python, AJAX, VBscript, and other programming or scripting languages used to compose and present a GUI. In an example retail software application, the application server 254 components may include pages that display product detail information and that allow users to select items for purchase. In some embodiments, the application server 254 components can include prompts (e.g., icons, text, buttons, etc.) that allow the user to trigger an AR feature (e.g., AR component 210) of the application.

The AR component 210 generally allows a user to visualize and virtually interact with an item (e.g., a product for sale) on the application 208 in a physical environment. For example, once triggered via the application 208 and/or the browser 206, the AR component 210 may activate the camera 216 and sensor suite 218 to present (or display) a video feed of the physical environment on the screen 110 of the computing device 102. The AR component 210 can retrieve a virtual object corresponding to the item from the database 256. The database 256, for example, includes object models 258 (e.g., 3D models) for various items that may be in inventory and available for purchase on the application 208.

The AR component 210 can detect a planar surface (e.g., ground, table, etc.) within the physical environment using the camera 216. For example, the camera 216 can capture one or more images (or video frames) of the physical environment and the AR component 210 can determine a 3D geometry of the space, based on the captured image(s). The AR component 210 can use a variety of computer vision techniques (e.g., scale-invariant feature transform (SIFT)) and/or software development kits (SDKs) (e.g., ARKit, ARCore, Wikitude, etc.) to detect plane geometry (e.g., a horizontal plane) within the physical environment based on the captured images. For example, using one or more of these tools, the AR component 210 can process each image and extract a set of feature points (e.g., an edge of an object, corner of an object, etc.) for each image (e.g., using SIFT). The AR component 210 can track the features across multiple images (or frames) as the computing device 102 moves (e.g., the AR component 210 may prompt the user to scan the floor with the computing device 102). During this tracking, the AR component 210 can estimate 3D pose information (e.g., current camera position and the positions of the features).

Once the AR component 210 determines that a sufficient number of feature points have been extracted (e.g., above a threshold), the AR component 210 can fit planes to the feature points and find the best match in terms of scale, orientation, and position. In some embodiments, the AR component 210 may render the detected plane onto the screen 110 of the computing device 102. For example, the AR component 210 may render a virtual grid onto the screen 110, representative of the detected plane. The AR component 210 may continually update the detected plane (e.g., based on feature extraction and plane fitting), as the computing device 102 moves. In this manner, the AR component 210 can identify planes for various surfaces (e.g., floor, table, couch, windowsill, etc.) in the physical environment.

The AR component 210 can perform ray casting (e.g., using one or more of the above tools) to determine (or identify) positions on the plane. Using ray casting, the AR component 210 can take a position in screen space (e.g., a two-dimensional point (2D) point (or location) on the screen 110) and provide a 3D vector (e.g., based on one or more attributes of the camera 216, such as focal length) for the 2D screen location. The AR component 210 can project (or cast) the 3D vector (outward from the screen 110) onto the plane to determine the 3D location (or position) where the 3D vector intersects the plane. In one embodiment, the AR component 210 can use this intersection point as a (target) placement position for a virtual object that is overlaid into the video feed provided on the screen 110. In one embodiment, the AR component 210 may perform ray casting using a center position in the screen space (e.g., center point on the screen 110) as the starting 2D screen location for the 3D vector.

In one embodiment, once the object model 258 of an item is retrieved (e.g., downloaded), the AR component 210 can render (e.g., by overlaying or inserting) the object model 258 in the video feed of the physical environment (shown on the screen 110). Once a position of the virtual object is fixed or anchored, the AR component 210 can allow the user to interact with the virtual object, e.g., by using the computing device 102 to view how the virtual object looks in the physical environment from different vantage points. In some embodiments, the AR component 210 can use ray casting to provide a 3D location in physical space corresponding to a user's touch on the screen 110, where the 3D location corresponding to the user's touch is an anchor point for the virtual object overlaid into the video feed provided on the screen 110.

As also shown, the AR component 210 includes a visualization tool 212, which is configured to perform one or more techniques described herein. The visualization tool 212 can include software, hardware, or combinations thereof. In one embodiment described herein, the visualization tool 212 is configured to determine an optimal range of distances from the computing device 102 for visualizing virtual objects in a physical environment using the computing device 102. The optimal range of distances may be a range of distances from the computing device 102 to positions where the virtual object can be placed, such that it is fully visible within the screen 110 of the computing device 102. As described in more detail below, as opposed to automatically rendering a virtual object on the screen 110 (as is done with conventional AR functionality), the visualization tool 212 can render the virtual object upon determining (e.g., based on the range of distances) that the virtual object when placed at a given distance would be able to fit within the screen 110. In this manner, the visualization tool 212 can significantly enhance user experience with AR features used to preview items on the application 208.

Note that FIG. 2 illustrates a reference example of a computing environment 200 in which the techniques presented herein can be implemented and that the techniques presented herein can be implemented in other computing environments. For example, in some embodiments, the computing environment 200 may include an AR system having an AR headset that provides a screen/display, camera, and/or one or more sensors. The AR headset may be a headset worn by the user, examples of which can include a head mounted display (HMD), eye-glasses, AR glasses, AR visor, helmet, etc. In some embodiments, the AR headset may be a standalone system. That is, the AR headset may include components (e.g., processor, memory, AR component 210, sensor suite 218, etc.) used to implement the techniques described herein. In some embodiments, the AR headset may be separate from the user's computing device. In these embodiments, the AR headset may be communicatively coupled to the computing device (e.g., via wireless and/or wired communications) and may exchange information with the AR component 210 on the computing device in order to implement the techniques described herein.

Figure 3:
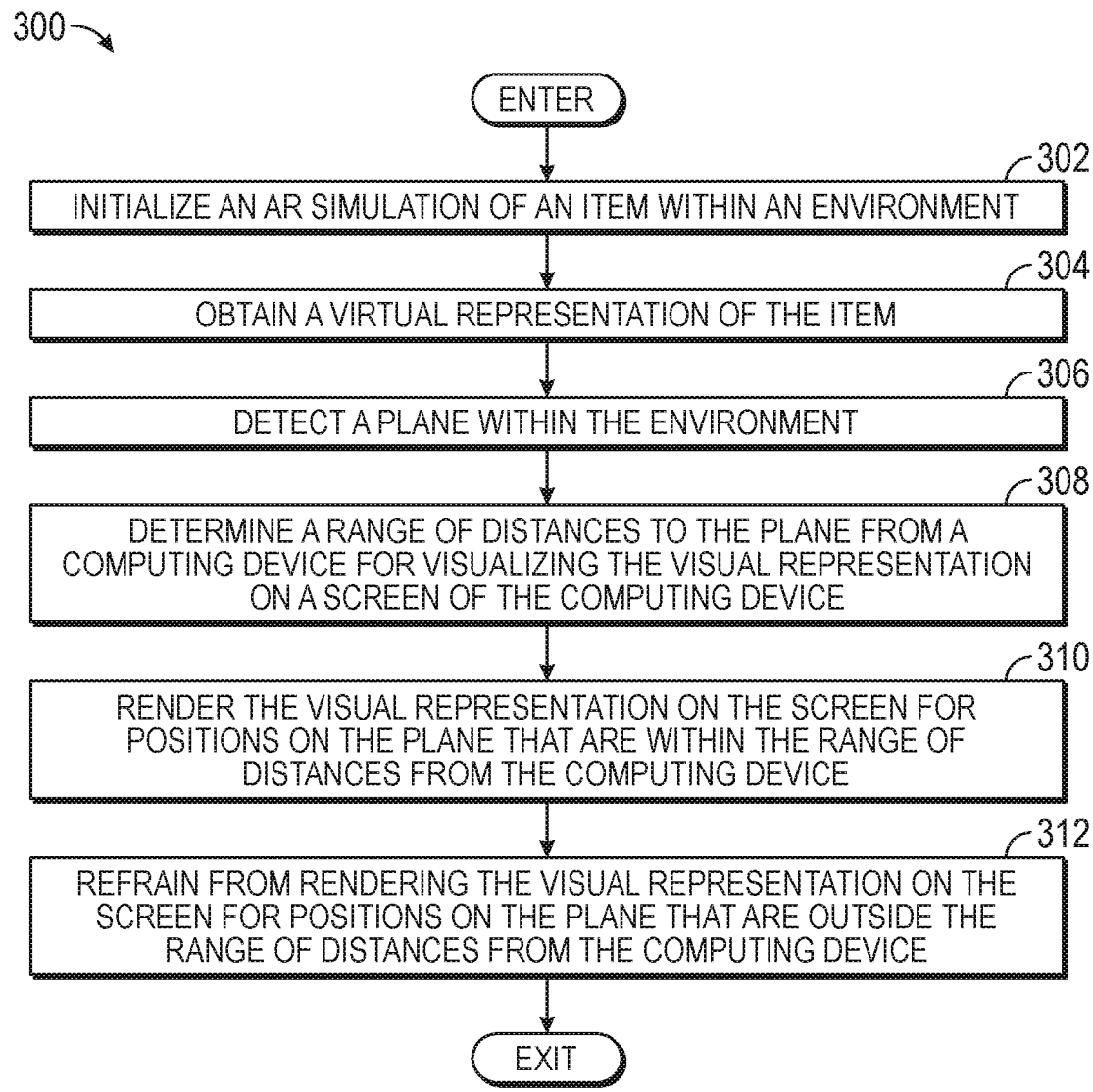
FIG. 3 is a flowchart of a method for improving visualization of a virtual object on a computing device, according to one embodiment.

FIG. 3 is a flowchart of a method 300 for improving visualization of a virtual object on a computing device, according to one embodiment. The method 300 may be performed by a visualization tool (e.g., visualization tool 212) and/or one or more components of a computing device (e.g., computing device 102).

The method 300 enters at block 302, where the visualization tool initializes an AR simulation of an item within an environment (e.g., physical environment 100). The item, for example, may be a product for sale that a user has identified and selected while browsing (or searching) for items on the application (e.g., application 208) and/or via a web browser (e.g., browser 206). In one embodiment, the application may provide a prompt (e.g., "View in Room") on a product detailed page for the item that allows the user to preview what the item would look like in the environment. Here, upon detecting that the prompt has been selected, the visualization tool can activate one or more components (e.g., camera 216, sensor suite 218, network interface 224, etc.) that will be used for the AR simulation.

At block 304, the visualization tool obtains a virtual representation (e.g., virtual object) of the item. The virtual representation may be a 3D model (e.g., object model 258) of the item. In one embodiment, the visualization tool may begin retrieving (e.g., downloading) the virtual representation upon determining that the AR simulation has been initialized. In some embodiments, the visualization tool may wait until the virtual representation has been retrieved before proceeding to block 306. In other embodiments, the visualization tool may perform the retrieval process in the background and proceed to block 306 (e.g., before the download is complete). In some embodiments, the virtual representation may be stored locally on the computing device (e.g., in storage 214). In these instances, the virtual representation may have been downloaded when the user previously activated the AR feature for the item when browsing on the application.

At block 306, the visualization tool detects a plane (e.g., planar surface, such as the ground, floor, table, ledge, windowsill, etc.) within the environment, e.g., using the feature extraction and plane fitting technique(s) described above. In one embodiment, the visualization tool may prompt the user to scan a surface within the environment using the computing device (e.g., by presenting an instruction on the screen of the computing device to point the computing device towards the surface) so that the visualization tool can detect the plane.

At block 308, the visualization tool determines a range of distances to the plane from the computing device for visualizing the visual representation on a screen (e.g., screen 110) of the computing device. In one embodiment, the visualization tool determines the range, based at least in part on (i) one or more physical attributes (e.g., physical dimensions) of the screen and (ii) one or more physical attributes of the virtual representation. In one embodiment, the visualization tool can obtain the physical attributes of the virtual representation from the 3D model of the item. For example, the physical attributes of the virtual representation may correspond to the physical dimensions of the 3D model.

Figure 7:
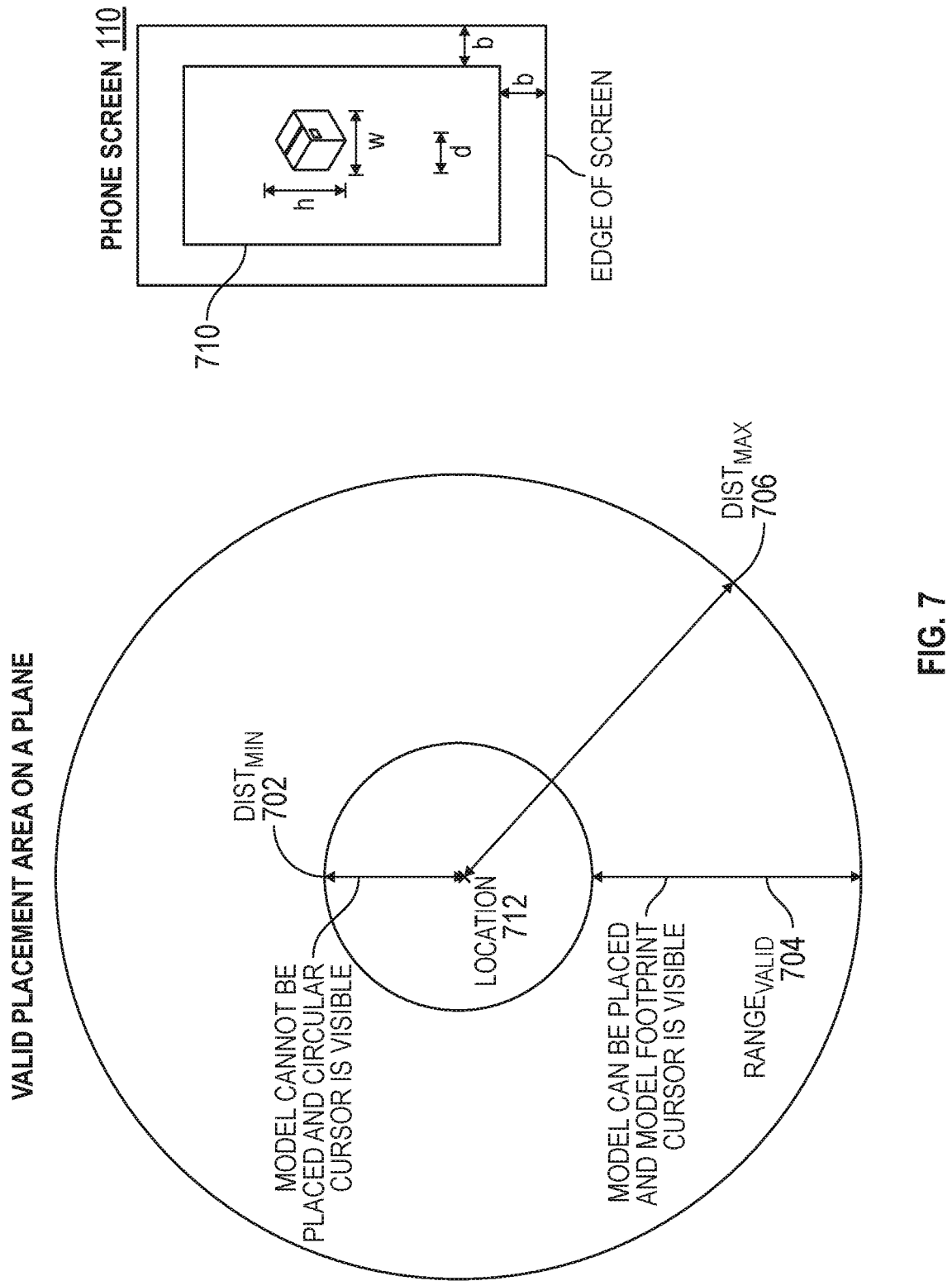
FIG. 7 illustrates an example valid placement position on a plane for a virtual object, according to one embodiment.

In one embodiment, the visualization tool can use determine the physical attributes of the screen using a device application programming interface (API). For example, once the AR simulation is initialized, the visualization tool can call the device API, which returns the physical dimensions (e.g., length and width) of the screen. In one embodiment, the device API may also return the dimensions (e.g., length and width) of a rectangle (or other predefined region)

within the screen that takes into account a buffer around the edge of the screen. As shown in FIG. 7, for example, the rectangle 710 within the screen 110 is defined by the buffer (b) around the edge of the screen 110. The visualization tool may use the dimensions of the rectangle 710 or the dimensions of the screen 110 for determining whether to render the virtual representation on the screen.

Referring briefly to FIG. 7, which illustrates an example valid (or optimal) placement area for a virtual representation of an item on a plane, assume the computing device is at a location 712. In this example, the visualization tool can determine the range of distances (range$_{valid}$) 704 (from location 712) as the following:

$$\text{range}_{valid} = [\text{dist}_{MIN}, \text{dist}_{MAX}] \quad (1)$$

where $\text{dist}_{MIN}$ is the minimum distance (702) from the location 712 and $\text{dist}_{MAX}$ is the maximum distance (706) from the location 712.

$\text{dist}_{MIN}$ (702) has a value between [0, maxdist$_{MIN}$] and is determined using Equation (2):

$$\text{dist}_{MIN} = \max(0, \min(f(h,w,b), \text{maxdist}_{MIN})) \quad (2)$$

where h is the height of the virtual representation on the screen (e.g., height of the model bounding box as shown in FIG. 7), w is the width of the virtual representation on the screen (e.g., width of the model bounding box as shown in FIG. 7), b is the buffer around the edge of the screen (which the virtual representation should be fully inside of), and maxdist$_{MIN}$ is the maximum minimum radius (e.g., maximum value of dist$_{MIN}$) from the location 712. f (h, w, b) is a function that returns a calculated minimum distance based on the model bounding box and its location in the environment, such that all bounding box corners are within the rectangle 710 defined by the edges of the screen (±the buffer, b). In one embodiment, h, w, and b may have units of points (pt) and maxdist$_{MIN}$ may have units of millimeters (mm).

$\text{dist}_{MAX}$ (706) has a value between [mindist$_{MAX}$, maxdist$_{MAX}$] and is determined using Equation (3):

$$\text{dist}_{MAX} = \max(\text{mindist}_{MAX}, \min(g(h,w,d), \text{maxdist}_{MAX})) \quad (3)$$

where d is the minimum allowable dimension (e.g., in units of points) of the model on the screen, mindist$_{MAX}$ is the minimum maximum radius (in mm) (e.g., minimum value of dist$_{MAX}$) from the location 712, and maxdist$_{MAX}$ is the maximum maximum radius (in mm) (e.g., maximum value of dist$_{MAX}$) from the location 712. g(h, w, d) is a function that returns a calculated maximum distance based on the model bounding box and its location in the environment, such that the width (w) and height (h) of the bounding box on the screen are greater than or equal to the minimum allowable dimension (d).

Referring back to FIG. 3, at block 310, the visualization tool may render the virtual representation on the screen for positions on the plane that are within the range of distances (e.g., range$_{valid}$ 704). At block 312, the visualization tool may refrain from rendering the virtual representation on the screen for positions on the plane that are outside the range of distances from the computing device. As shown in FIG. 7, for example, the visualization tool may not render the virtual representation for positions that are at least one of: (i) within the distance range [0, dist$_{MIN}$ (702)] and (ii) greater than dist$_{MAX}$ (706).

Note, however, that in some embodiments, the visualization tool (at block 312) may render a modified version (or representation) of the virtual representation on the screen. In one particular embodiment, the visualization tool can render a smaller version of the virtual representation (e.g., as the modified representation) on the screen. In another particular embodiment, the visualization tool can render an outline of the virtual representation (e.g., as the modified representation) on the screen. In yet another embodiment, the visualization tool can render the virtual representation with a certain transparency (e.g., below 100% transparency) as the modified representation on the screen. In general, however, the visualization tool can alter any number (or combination) of attributes of the virtual representation to generate a modified version. Such attributes can include, but are not limited to, shading, color, transparency, size, highlighting, opacity, etc.

In one embodiment, the visualization tool determines the distance from the computing device to a target placement position on the plane, based on a ray casting, e.g., using the center 2D position on the screen as the starting 2D screen location. For example, the visualization tool can determine the 3D location of the where the 3D vector from the 2D screen location intersects the plane as the target placement position, and determine the distance between the position of the computing device (at location 712) and the target placement position on the plane.

In one embodiment, maxdist$_{MIN}$, mindist$_{MAX}$, and maxdist$_{MAX}$ may be preconfigured for the particular virtual representation (e.g., object model 258) of the item and retrieved along with the virtual representation (e.g., from the database 256). These pre-configured values may account for particular cases in which, due in part to the size of the item, it would be impractical and/or not possible to fully display the virtual representation of the item within the screen of the computing device.

For example, in the case of a very large item (e.g., a furniture item, such as couch), the visualization tool may determine that the virtual representation for the item would have to be placed a large distance (e.g., above a threshold distance) away from the computing device in order to be fully displayed on the screen, which may be impractical for the user. In this instance, the maxdist$_{MIN}$ (for a couch item) may be set to a distance that allows for the virtual representation to be displayed on the screen, even if the virtual representation cannot fully fit within the screen. Likewise, the maxdist$_{MAX}$ (for the couch item) may be set to a distance that prevents the virtual representation from being displayed on the screen at a position that is a large distance away (e.g., above a threshold distance) from the computing device. For example, as described below, in this instance, the visualization tool may keep the rendered virtual representation at the maxdist$_{MAX}$ position, even if the visualization tool determines the computing device is targeting a position with a distance greater than maxdist$_{MAX}$.

In another example, in the case of a very small item (e.g., a smart speaker, a pen, etc.), the visualization tool may determine that the virtual representation for the item may become too small for the user to interact with on the screen if placed a large distance (e.g., above a threshold distance) away from the computing device. However, due to the size of the item, it may be impractical to find a distance where the size of the virtual representation is above a certain threshold size. Accordingly, in this instance, the mindist$_{MAX}$ (for such a small item, such as a smart speaker) may be set to a distance that allows for the virtual representation to be displayed on the screen, even if the virtual representation would be below a threshold size.

Figure 4:
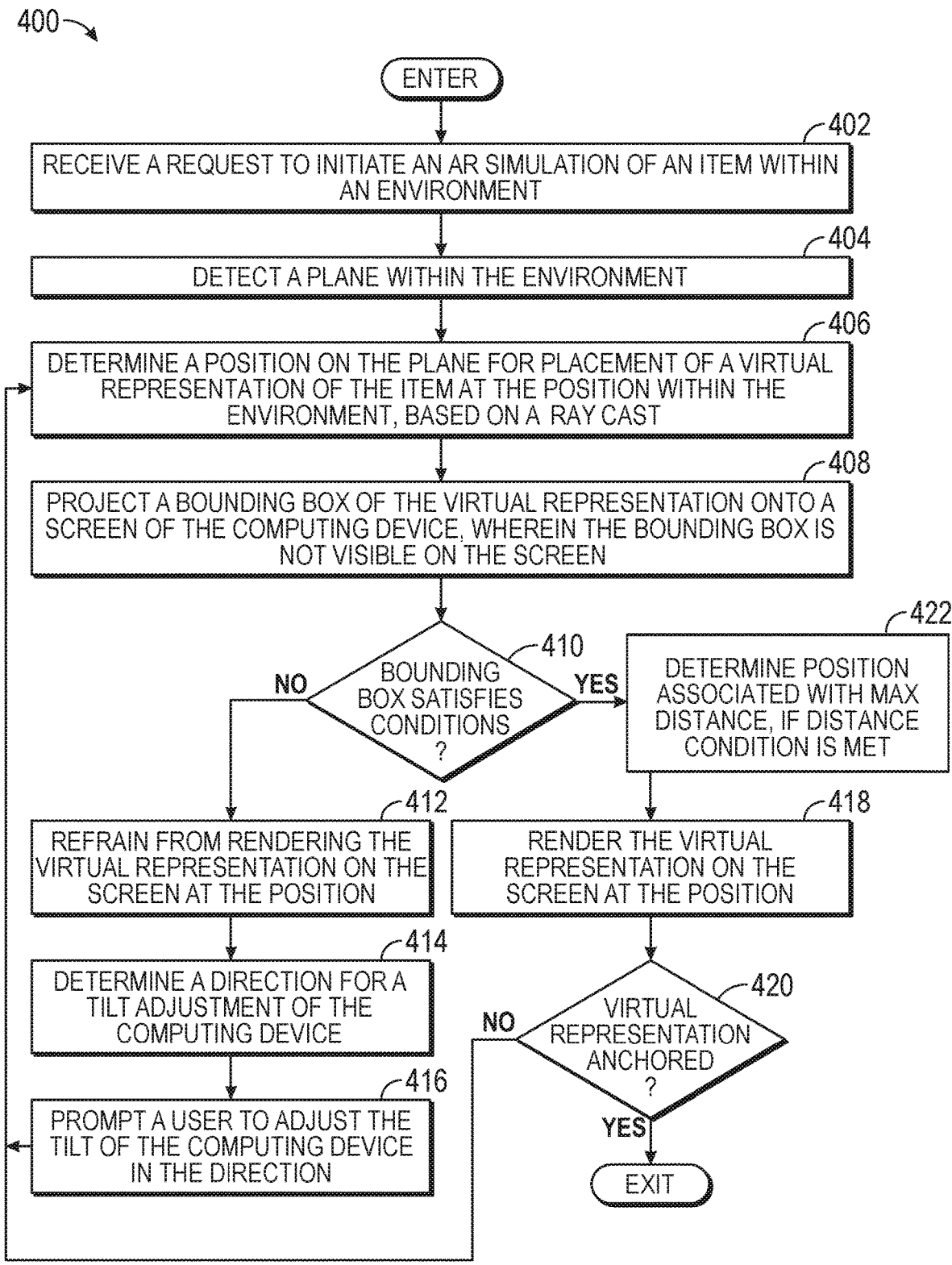
FIG. 4 is a flowchart of a method for determining whether to render a virtual object on a screen of a computing device, according to one embodiment.

FIG. 4 is a flowchart of a method 400 for determining whether to render a virtual representation of an item on a screen (e.g., screen 110) of a computing device (e.g., computing device 102), according to one embodiment. The method 400 may be performed by a visualization tool (e.g., visualization tool 212) and/or one or more components of a computing device (e.g., computing device 102).

The method 400 enters at block 402, where the visualization tool receives a request to initiate an AR simulation of an item within an environment (e.g., physical environment 100). At block 404, the visualization tool detects a plane within the environment. At block 406, the visualization tool determines a position on the plane for placement of a virtual representation (e.g., object model 258) of the item at the position within the environment, based on a ray cast from the computing device. At block 408, the visualization tool projects a bounding box of the virtual representation onto a screen of the computing device, where the bounding box is not visible on the screen (e.g., is transparent to the user). As used herein, a bounding box may also be referred to as a bounding volume (e.g., a closed volume that completely contains the virtual representation).

At block 410, the visualization tool determines whether the bounding box satisfies one or more conditions. In one embodiment, the condition(s) may include the bounding box fitting within (or being contained within) an area of the screen or the area of a predefined region (e.g., rectangle 710) defined within the screen. In one embodiment, the condition(s) may include the bounding box being at a position having a distance that is at (or greater than) $maxdist_{MIN}$. For example, in this embodiment, the visualization tool may determine that the bounding box satisfies the condition, even if the bounding box at that position cannot fit within the screen. As noted above, $maxdist_{MIN}$ may be a particular value preconfigured for the virtual representation (e.g., based on physical dimensions of the item).

In another embodiment, the condition(s) may include the bounding box being at a position having a distance that is at (or below) $mindist_{MAX}$. For example, in this embodiment, the visualization tool may determine that the bounding box satisfies the condition, even if a size of the bounding box at that position is below a threshold size (e.g., the minimum allowable dimension (d) of the model on the screen). As noted above, $mindist_{MAX}$ may be a particular value preconfigured for the virtual representation (e.g., based on physical dimensions of the item).

In another embodiment, the condition(s) may include the bounding box being at a position having a distance that is greater than $maxdist_{MAX}$. Here, for example, the visualization tool may determine that the condition is satisfied even if the size of the bounding box would be less than a threshold size (e.g., the minimum allowable dimension (d) of the model on the screen). Note, however, in this embodiment, instead of rendering the virtual representation at the targeted position (determined at block 406), the visualization tool may determine the position associated with $maxdist_{MAX}$ (at block 422), and render the virtual representation on the screen (at block 418) using this position (determined at block 422). In this manner, the visualization tool can maintain the rendered virtual representation at the $maxdist_{MAX}$ position, when the computing device is targeting a position beyond the $maxdist_{MAX}$ position.

When the visualization tool determines that the bounding box satisfies the condition(s) (block 410), the visualization tool proceeds to block 422, where it determines a position associated with the maximum distance (e.g., $maxdist_{MAX}$), if a distance condition is met (e.g., targeted position is at a distance greater than $maxdist_{MAX}$). At block 418, the visualization tool renders the virtual representation on the screen at the position (block 418). The position at block 418, for example, may be the targeted position determined at block 406 or the position associated with the maximum distance determined at block 422.

The visualization tool then determines whether the virtual representation has been anchored (e.g., to the position) (block 420). If the virtual representation has been anchored, the method 400 exits. On the other hand, if the virtual representation has not been anchored, the method 400 proceeds to block 406. When the visualization tool determines that the bounding box does not satisfy the condition(s) (block 410), the visualization tool refrains from rendering the virtual representation on the screen at the position (block 412). In one embodiment, the visualization tool (at block 412) can render a modified representation of the virtual representation on the screen at the position.

At block 414, the visualization tool then determines a direction for a tilt adjustment of the computing device. For example, in one embodiment, the visualization tool may determine that the position is within a threshold distance range to the computing device (e.g., $[0, dist_{MIN} (702)]$), such that the bounding box cannot fit within the rectangle defined within the screen. In this embodiment, the visualization tool may determine that the computing device needs to be tilted in an upward direction (e.g., to increase the angle of the computing device with respect to the plane, and therefore, the distance of the computing device to the plane). At block 416, the visualization tool prompts the user to adjust the tilt of the computing device in the direction (determined at block 414). The method 400 then proceeds to block 406.

Note that while the above describes method 400 in the context of a "tilt up" scenario, embodiments can also perform method 400 for "tilt down" scenarios. In these embodiments, the condition(s) at block 410 may include a size of the bounding box on the screen being greater than or equal to a threshold size (e.g., the minimum allowable dimension (d) of the model on the screen) and/or the bounding box fitting within an area of the screen (or predefined region of the screen). Assuming these condition(s) are satisfied, the visualization tool may render the virtual representation on the screen at the position (block 418). If the condition(s) are not satisfied, the visualization tool may refrain from rendering the virtual representation on the screen at the position (block 412) and may determine a direction for a tilt adjustment of the computing device. For example, the visualization tool may determine that the position is at a distance greater than a threshold distance (e.g., $>dist_{MAX} (706)$) to the computing device, such that the bounding box would be smaller than a threshold size when projected onto the screen. In this case, the visualization tool may determine that the computing device needs to be tilted in a downward direction (e.g., to decrease the angle of the computing device with respect to the plane, and therefore, the distance of the computing device to the plane).

Figure 5:
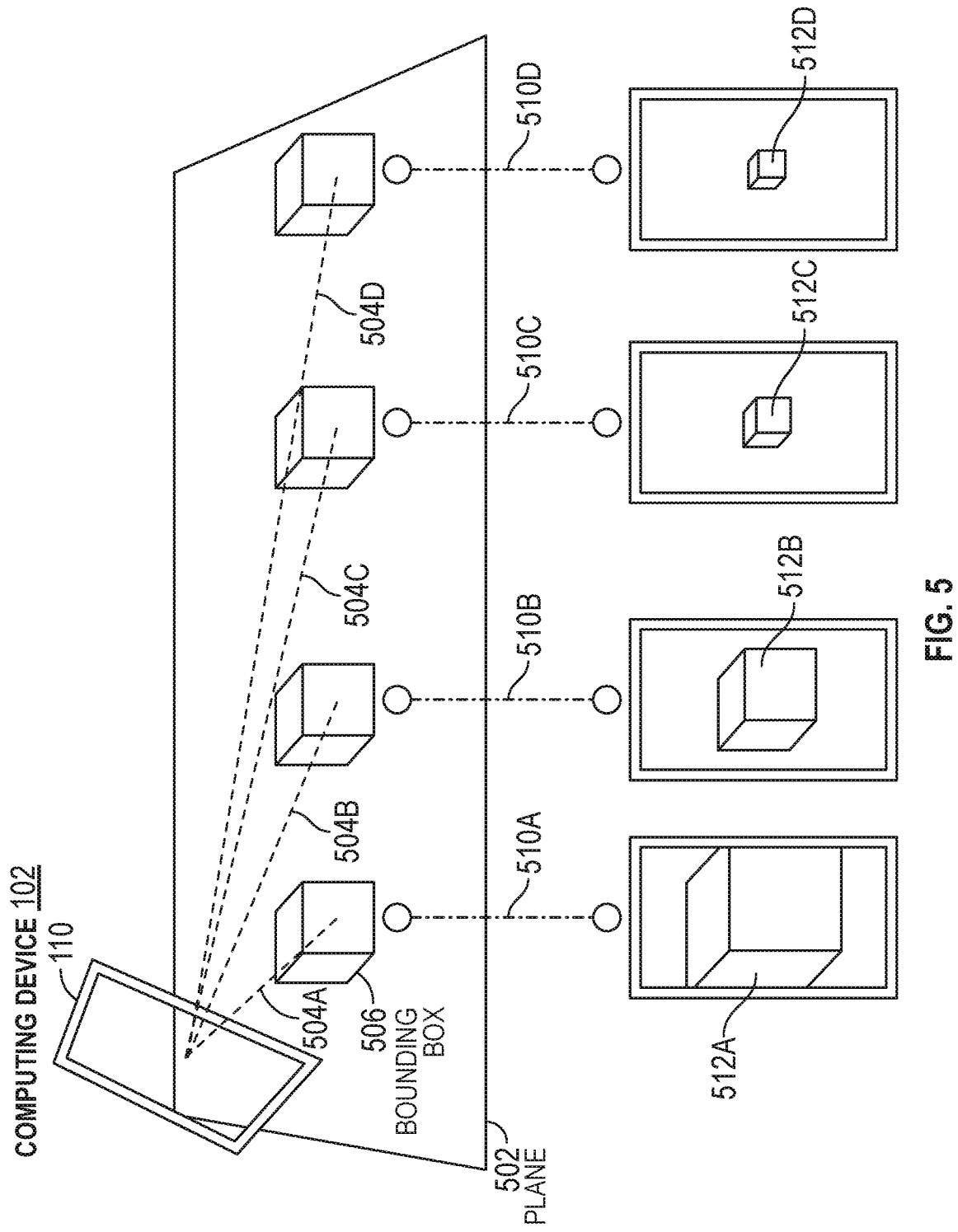
FIG. 5 illustrates an example scenario of rendering a virtual object, according to one embodiment.

FIG. 5 illustrates an example scenario of rendering a virtual representation of an item, according to one embodiment. Here, the visualization tool (e.g., visualization tool 212) may initially target a first position on the plane 502, based on ray cast 504A from the computing device 102. For example, the angle of the computing device 102 (with respect to the plane 502) determines where the placement (or visualization) position is on the plane 502. After determining the first position, the visualization tool may place the bounding box 506 (of an item) at the first position (but not make the bounding box 506 visible to the user on the screen 110 of the computing device 102). The visualization tool may then project (510A) the (3D) bounding box 506 onto the (2D) screen 110 of the computing device 102. Here, because the projection 512A is not fully visible within the screen 110, the visualization tool can determine to refrain from rendering the virtual representation on the screen 110. Note, however, that in some embodiments, the visualization tool may still determine to render the virtual representation on the screen 110 if the item meets the criteria for very large or very small items, described above with reference to FIG. 3.

After determining that the projection 512A is not fully visible within the screen 110, the visualization tool may prompt the user to tilt the computing device in an upward direction. In response, the visualization tool can target a second position on the plane 502, based on ray cast 504B from the computing device 102, and place the bounding box 506 at the second position (but not make the bounding box 506 visible to the user on the screen 110 of the computing device 102). The visualization tool may then project (510B) the (3D) bounding box 506 onto the (2D) screen 110 of the computing device 102. Here, because the projection 512B is fully visible within the screen 110, the visualization tool can determine to render the virtual representation on the screen 110.

In some cases, the visualization tool may target a third position on the plane 502, based on ray cast 504C from the computing device 102 and/or a fourth position on the plane 502, based on ray cast 504D from the computing device 102. For example, the user may not have anchored the virtual representation to a position on the plane 502 and may have continued to tilt the phone in an upward direction or downward direction after targeting a previous position on the plane. After projecting (510C) the bounding box 506 at the third position onto the screen 110, the visualization tool determines that the projection 512C is fully visible, and may determine to render the virtual representation on the screen (e.g., assuming the projection 512C is above a threshold size (d)). Similarly, after projecting (510D) the bounding box 506 at the fourth position onto the screen 110, the visualization tool determines that the projection 512D is fully visible, and may determine to render the virtual representation on the screen (e.g., assuming the projection 512D is above a threshold size (d)).

In general, the visualization tool may continually determine whether to render the virtual representation on the screen or stop rendering the virtual representation on the screen, based on the projection of the bounding box onto the screen 110 of the computing device 102. The tilt of the computing device 102 generally determines the distance of the virtual representation on the plane 502, which in turn, determines the size of the projection on the screen 110. For example, as shown, as the bounding box 506 gets further away from the computing device 102 on the plane 502, the projection of the bounding box gets smaller on the screen 110.

Figure 6:
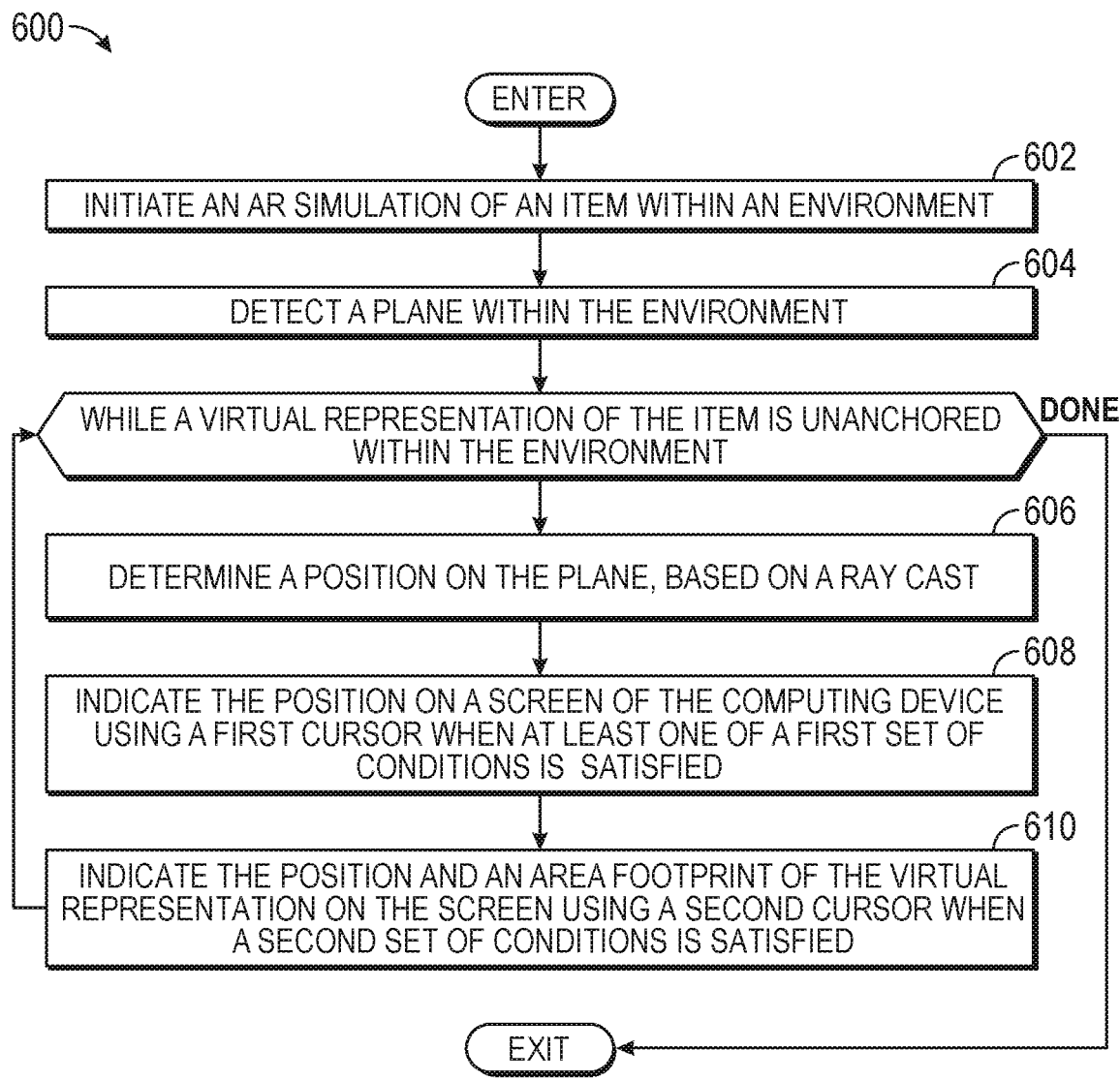
FIG. 6 is a flowchart of a method for indicating a placement position of a virtual object, according to one embodiment.

FIG. 6 is a flowchart of a method 600 for indicating a placement position of a virtual representation of an item, according to one embodiment. The method 600 may be performed by a visualization tool (e.g., visualization tool 212) and/or one or more components of a computing device (e.g., computing device 102). The method 600 may enter at block 602, where the visualization tool initiates an AR simulation of an item within an environment. At block 604, the visualization tool detects a plane within the environment. At block 606, the visualization tool determines a position on the plane, based on a ray cast.

At block 608, the visualization tool indicates the position on a screen (e.g., screen 110) of the computing device using a first cursor when at least one of a first set of conditions is satisfied. In one embodiment, the first set of conditions may include determining that a virtual representation is not currently available for the item (e.g., the visualization tool may in the process of retrieving the virtual representation from the database 256). In one embodiment, the first set of conditions may include determining that the position on the plane is not a valid position for rendering the virtual representation (e.g., the position may not be within $range_{valid}$ 704).

At block 610, the visualization tool indicates the position and an area footprint of the virtual representation on the screen when a second set of conditions is satisfied. In one embodiment, the second set of conditions may include determining that (i) a virtual representation is available for the item (e.g., the virtual representation has been retrieved from the database 256) and (ii) the position on the plane is a valid position for rendering the virtual representation (e.g., the position is within $range_{valid}$ 704).

In some embodiments, the first cursor may have a different shape, size, and/or configuration than the second cursor. For example, the first cursor may have a predefined (or fixed) shape/size/configuration that is shown on the screen when one or more of the first set of conditions is satisfied. The first cursor may be used when the visualization tool determines to refrain from rendering the virtual representation on the screen. For example, the first cursor may be shown (or rendered) on the screen instead of (or in absence of) the virtual representation.

On the other hand, in some embodiments, the second cursor may have a shape, size, and/or configuration that is based on the physical attributes of the virtual representation. For example, when the second set of conditions is satisfied, the visualization tool may switch to using the second cursor, which, in one embodiment, changes in size and shape to indicate the area footprint of the virtual representation. The area footprint, for example, may be representative of the bounding box projected on the screen of the computing device. In another embodiment, the area footprint may be representative of a 3D mesh of the item. The second cursor may be used when the visualization tool determines to render the virtual representation on the screen. For example, the second cursor may be shown (or rendered) on the screen along with the virtual representation of the item.

FIGS. 8A-8E illustrate an example scenario of visualizing a virtual object in a physical environment using a computing device, according to one embodiment. As noted, the application (e.g., application 208) may enable the user to browse inventory of items for sale on the application and view more information regarding particular items prior to purchasing the items.

Figure 8A:
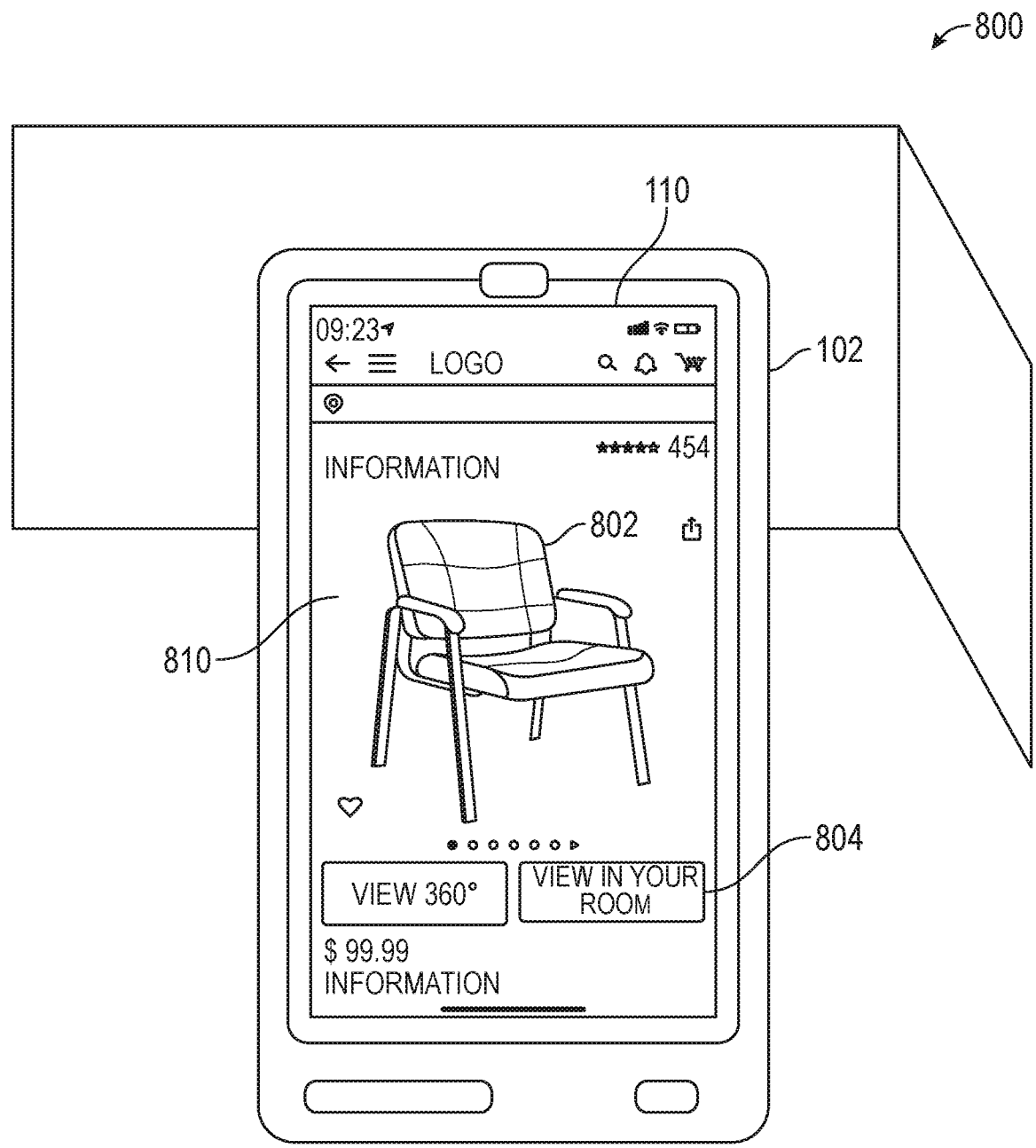
FIGS. 8A-8E illustrate an example scenario of visualizing a virtual object using a computing device, according to one embodiment.

As shown in FIG. 8A, the user may select to view more information regarding item 802 (e.g., a chair) and be shown a product detail page 810 for the item 802. In this example, the product detail page 810 provides the user with the option to preview how the item 802 would look in the physical environment 800. As shown, the user can select prompt 804 ("View in Your Room") to trigger the initialization of an AR simulation of the item 802 in the physical environment 800.

Figure 8B:
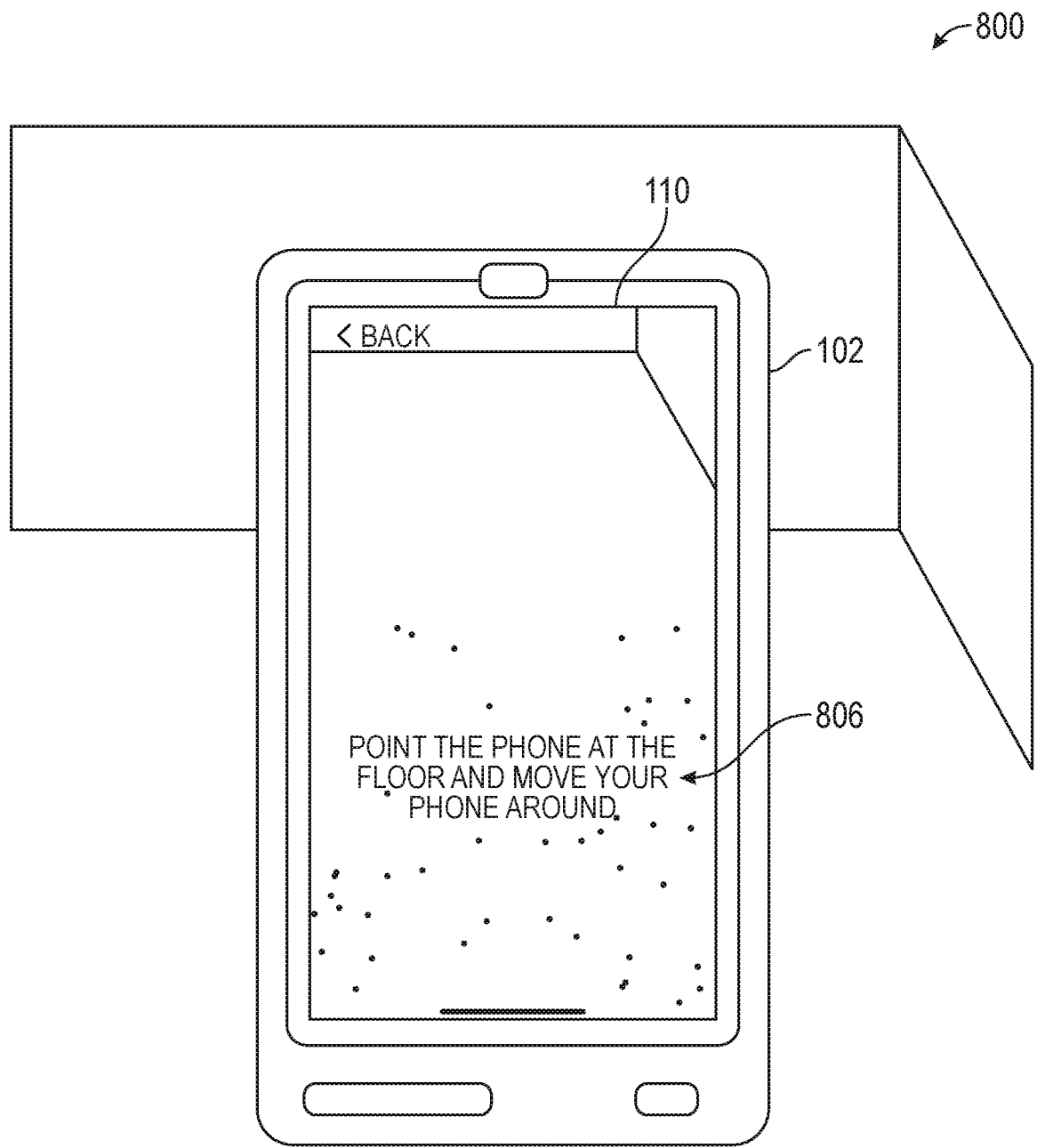
Figure 8C:
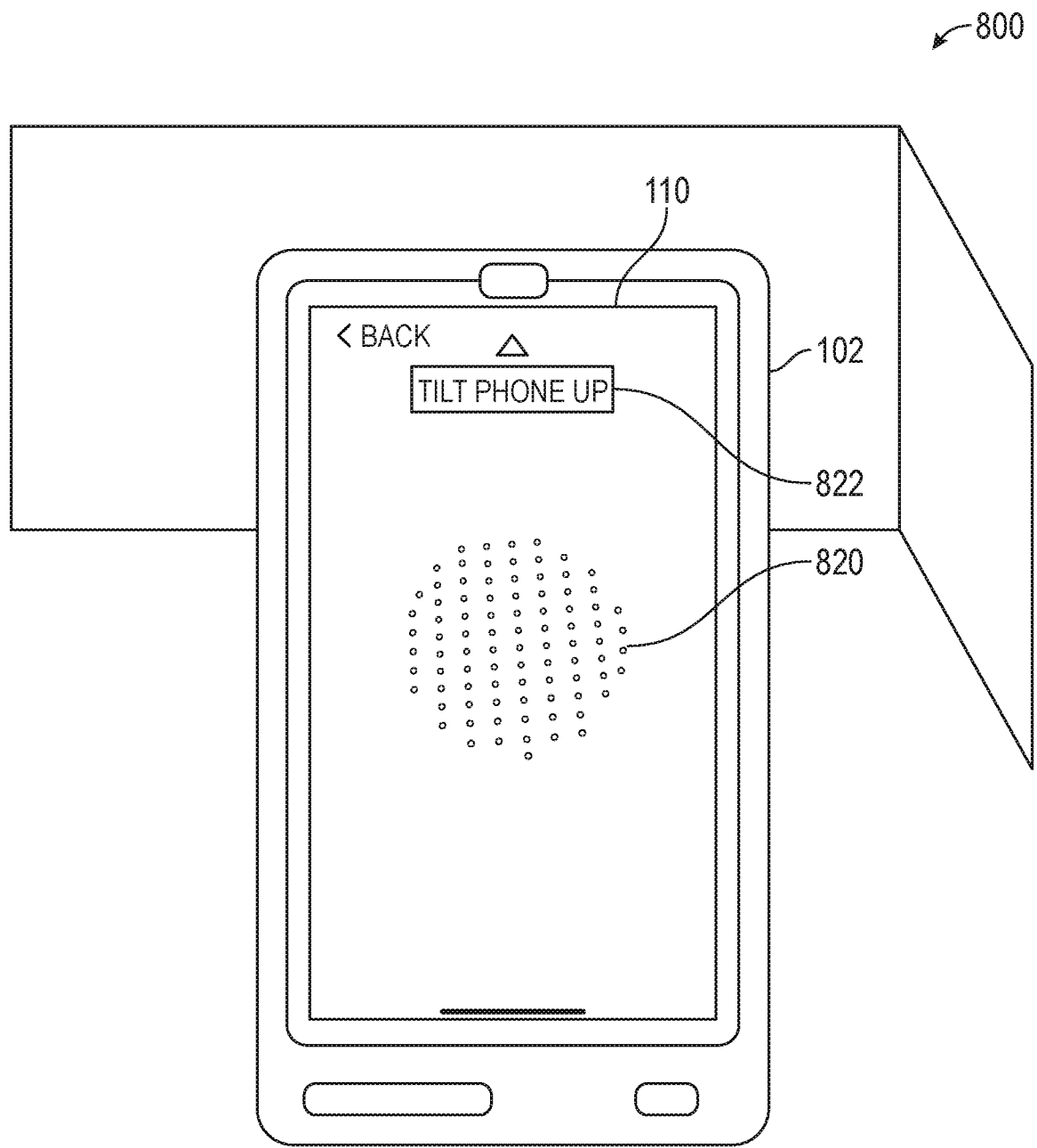

Subsequently, as shown in FIG. 8B, the application (via the visualization tool 212) provides a prompt 806 on the screen 110, instructing the user to point the computing device 102 towards the floor so that the computing device can scan the floor to identify a plane in the physical environment 800. Subsequently, as shown in FIG. 8C, the application refrains from automatically rendering the virtual representation of the item 802 on the screen 110. In this case, the application may have determined (i) that the virtual representation was not available and/or (ii) that the placement position targeted by the computing device 102 (based on a ray cast) was not a valid (optimal) position for rendering the virtual representation on the screen 110. Instead, as shown, the application indicates the placement position targeted by the computing device 102 using the first cursor 820. As noted above, the first cursor 820 may have a predefined (fixed) shape (e.g., a circle in this embodiment) and may be used in instances when the application determines that at least a first set of conditions is satisfied.

Figure 8D:
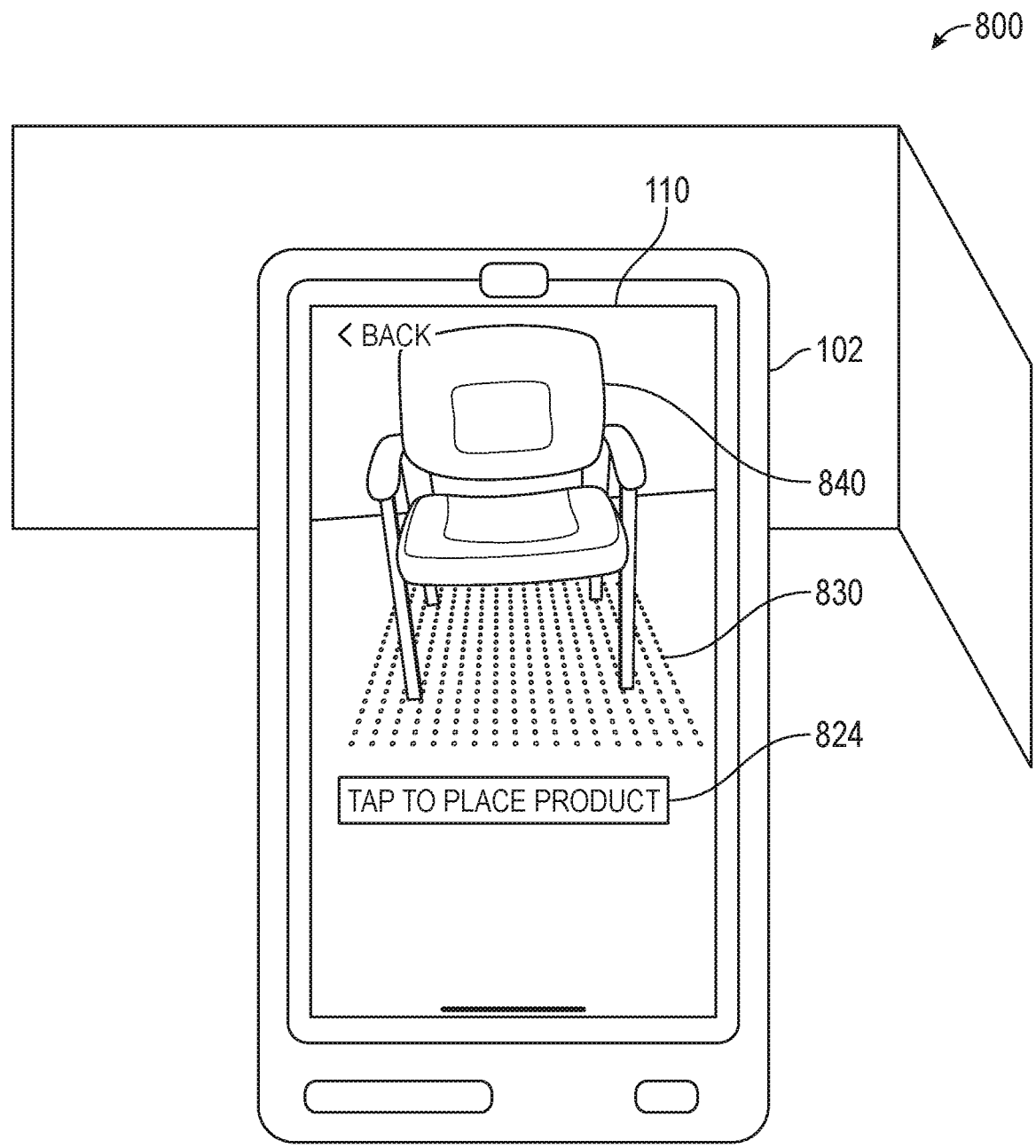

As also shown in FIG. 8C, in response to determining that the placement position is not a valid position, the application provides a prompt 822 instructing the user to tilt the phone in an upward direction. Subsequently, as shown in FIG. 8D, the application renders the virtual representation 840 of the item 802 on the screen 110. In this case, the application may have determined (i) that the virtual representation 840 was available and (ii) that the placement position targeted by the computing device 102 (based on a ray cast) was a valid (optimal) position for rendering the virtual representation 840 on the screen 110.

As also shown in FIG. 8D, the application may switch to using a second cursor 830 to indicate the position of the virtual representation 840 and an area footprint (corresponding to the projection of the (transparent) bounding box on the screen 110). While rendered, the application may also provide a prompt 824, which allows the user to anchor (or place) the virtual representation 840 in the targeted placement position. The application may proceed in this manner, rendering and ceasing the rendering of the virtual representation 840 based on whether the virtual representation 840 can fit within the screen 110, until the virtual representation 840 is anchored. For example, once anchored, the application may allow the user to drag and place the virtual representation 840 in any position on the plane (regardless of whether it would be fully visible within the screen 110).

Figure 8E:
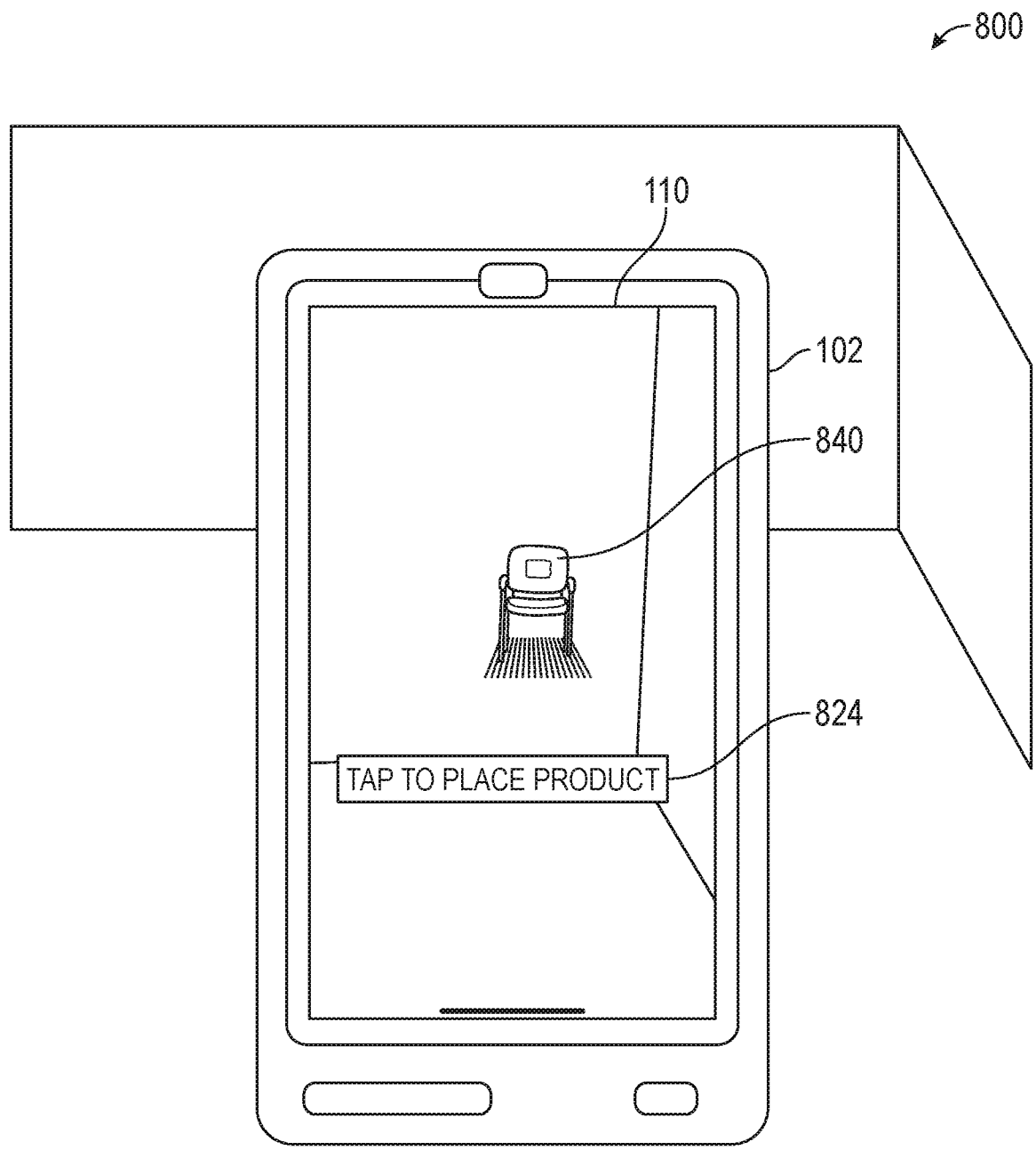

As shown in FIG. 8E, however, in some cases, the user may not choose to anchor the virtual representation 840 and may continue tilting the computing device until the virtual representation 840 gets smaller and smaller. As shown in FIG. 8E, in one embodiment, the application may continue to render the virtual representation 840 on the screen 110, e.g., until the virtual representation 840 reaches a position on the plane that is at a maximum threshold distance (e.g., $maxdist_{MAX}$ configured for the virtual representation 840). When the virtual representation 840 reaches the maximum threshold distance, the application may prevent the user from attempting to place the virtual representation 840 at a distance beyond the maximum threshold distance. For example, the application can continue rendering the virtual representation 840 at the position that is at the maximum threshold distance (e.g., regardless of whether the user is continuing to increase the tilt of the phone upwards) as opposed to stopping the rendering of the virtual representation 840 for a targeted position that is beyond the maximum threshold distance.

Advantageously, embodiments described herein can significantly improve visualization of AR objects on computing devices, which in turn can enhance user experience when browsing items for sale on an application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data (e.g., object models 258) available in the cloud. For example, the application can retrieve one or more object models 258 from the cloud to use when providing an AR simulation of the item in a physical environment using the computing device 102. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computing device, comprising:
a camera device;
a screen;
a processor; and
a memory storing instructions, which, when executed on the processor perform an operation comprising:
upon receiving a request to initialize an augmented reality (AR) simulation of a product for sale within a physical environment, detecting a plane within the physical environment using the camera device;

determining a first position on the plane, based on a first ray cast from the computing device;

projecting a first bounding box of a three-dimensional (3D) model of the product for sale onto the screen at the first position on the plane, wherein the first bounding box is not visible on the screen; and upon determining that at least a portion of the first bounding box projected onto the screen at the first position is outside of the screen:

refraining from rendering the 3D model of the product for sale onto the screen at the first position; and presenting an instruction on the screen to adjust a tilt of the computing device in an upward direction.

2. The computing device of claim 1, the operation further comprising:

upon determining that the tilt of the computing device has been adjusted, determining a second position on the plane, based on a second ray cast from the computing device;

projecting a second bounding box of the 3D model of the product for sale onto the screen at the second position on the plane, wherein the second bounding box is not visible on the screen; and upon determining that the second bounding box is contained within the screen, rendering the 3D model of the product for sale onto the screen at the second position.

3. The computing device of claim 2, the operation further comprising:

after rendering the 3D model of the product for sale onto the screen at the second position, determining a third position on the plane, based on a third ray cast from the computing device;

projecting a third bounding box of the 3D model of the product for sale onto the screen at the third position on the plane, wherein the third bounding box is not visible on the screen; and upon determining that at least a portion of the third bounding box is outside of the screen:

refraining from rendering the 3D model of the product for sale onto the screen at the third position; and presenting the instruction on the screen to adjust the tilt of the computing device in an upward direction.

4. The computing device of claim 3, wherein the third bounding box of the 3D model of the product for sale is projected onto the screen after determining that the 3D model of the product for sale is unanchored to the second position.

5. The computing device of claim 1, wherein determining that at least the portion of the first bounding box is outside of the screen comprises determining that at least the portion of the first bounding box is outside of a predefined region within an area of the screen.

6. The computing device of claim 5, wherein the predefined region comprises an area of a rectangle.

7. A computer-implemented method comprising:

in response to a request to initialize an augmented reality (AR) simulation of an item within a physical environment, obtaining a virtual representation of the item and detecting a plane within the physical environment;

determining a range of distances to the plane from a computing device for visualizing the virtual representation on a screen of the computing device, based at least in part on (i) one or more physical attributes of the screen and (ii) one or more physical attributes of the virtual representation;

rendering the virtual representation on the screen for positions on the plane targeted by the computing device that are within the range of distances from the computing device; and refraining from rendering the virtual representation on the screen for positions on the plane targeted by the computing device that are outside of the range of distances from the computing device.

8. The computer-implemented method of claim 7, wherein the one or more physical attributes of the virtual representation comprise physical dimensions of a three-dimensional (3D) model of the item when the 3D model is projected onto the screen.

9. The computer-implemented method of claim 7, wherein the range of distances comprises a set of distances from the computing device to positions on the plane where the virtual representation can be rendered, such that the virtual representation is fully visible on the screen.

10. The computer-implemented method of claim 7, wherein the range of distances comprises a set of distances from the computing device to positions on the plane where the virtual representation can be rendered, such that a size of the virtual representation on the screen is greater than a threshold size.

11. The computer-implemented method of claim 7, wherein the range of distances comprises at least one distance from the computing device to a position on the plane where the virtual representation can be rendered, such that the virtual representation is partially shown on the screen.

12. The computer-implemented method of claim 7, wherein the range of distances comprises at least one distance from the computing device to a position on the plane where the virtual representation can be rendered, such that a size of the virtual representation on the screen is below a threshold size.

13. The computer-implemented method of claim 7, wherein refraining from rendering the virtual representation comprises rendering a modified representation of the virtual representation on the screen.

14. A computer-implemented method, comprising:

in response to a request to initialize an augmented reality (AR) simulation of an item within a physical environment, detecting a plane within the physical environment;

determining a position on the plane, based on a ray cast from a computing device;

presenting a first cursor on a screen of the computing device to indicate the position on the plane, when a first set of conditions is satisfied; and presenting a second cursor on the screen to indicate the position on the plane and an area footprint associated with a virtual representation of the item, when a second set of conditions is satisfied, wherein the first cursor is different than the second cursor.

15. The computer-implemented method of claim 14, wherein the first cursor has a fixed size.

16. The computer-implemented method of claim 14, wherein the first set of conditions comprises at least one of: (i) determining that the virtual representation of the item is not available and (ii) determining that the position on the plane is an invalid position for rendering the virtual representation on the screen.

17. The computer-implemented method of claim 14, wherein:

the first set of conditions comprises determining to refrain from rendering the virtual representation on the screen; and the first cursor is presented on the screen in absence of a rendering of the virtual representation on the screen.

18. The computer-implemented method of claim 14, wherein:

the virtual representation comprises a three-dimensional (3D) model of the item; and the area footprint indicates an area of a bounding box of the 3D model projected onto the screen.

19. The computer-implemented method of claim 14, wherein the second set of conditions comprise (i) determining that the virtual representation is available and (ii) determining that the position on the plane is a valid position for rendering the virtual representation on the screen.

20. The computer-implemented method of claim 14, wherein:

the second set of conditions comprises determining to render the virtual representation on the screen; and the second cursor is presented on the screen while the virtual representation is rendered on the screen.

* * * * *